(No Model.)

E. B. MEYROWITZ.
SADDLE FOR SPECTACLES.

No. 600,496. Patented Mar. 8, 1898.

Attest:
Howell Battle
Herbert S. Bryant.

Inventor:
Emil B. Meyrowitz
Attorney.

UNITED STATES PATENT OFFICE.

EMIL B. MEYROWITZ, OF RIDGEFIELD, NEW JERSEY, ASSIGNOR TO THE MEYROWITZ MANUFACTURING COMPANY, OF SAME PLACE.

SADDLE FOR SPECTACLES.

SPECIFICATION forming part of Letters Patent No. 600,496, dated March 8, 1898.

Application filed May 25, 1897. Serial No. 638,106. (No model.)

*To all whom it may concern:*

Be it known that I, EMIL B. MEYROWITZ, a citizen of the United States of America, and a resident of Ridgefield, in the State of New Jersey, have invented a new and useful Improvement in Saddles for Spectacles, of which the following is a specification.

This invention relates to means for giving the wearers of spectacles relief from the pressure upon the nose due to the weight of the lenses and their frames or attachments; and it consists in a novel device whereby a pair of pads adapted to rest upon the face at the sides of the nose may be attached to the bridge of any make of spectacles and readily adjusted by means of the optician's pliers, so as to relieve the pressure upon the crest of the nose entirely, if necessary, and so as to readily locate them and set them, as to angle, with reference to the comfort of the person who is being fitted.

The invention further consists in a device of the above description combining a rigid or substantially rigid arch with a pair of side pads, pliable attaching devices, and pliable connections between the arch and pads to insure the retention of the side pads in correct position; also, in a specific device of this description adapted to be punched out of suitable metal in one piece, as hereinafter more particularly described.

A sheet of drawings accompanies this specification as part thereof.

Figure 1:
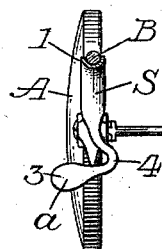
Figure 2:
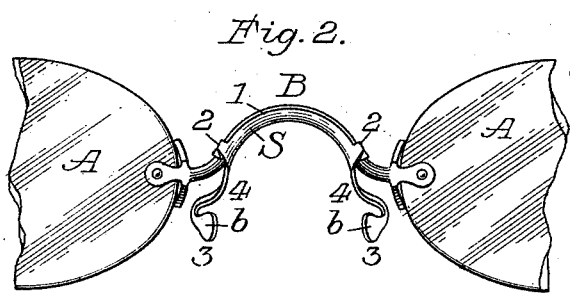
Figure 3:
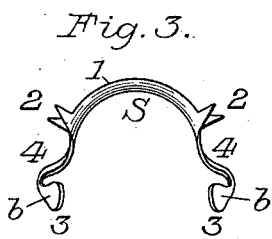
Figure 4:
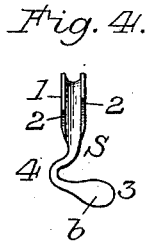
Figure 5:
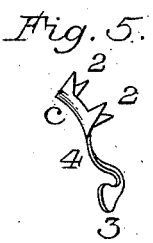

Figure 1 of the drawings represents a section through the bridge of a pair of frameless spectacles provided with my improved saddle. Fig. 2 represents a front view of the metal portion of said pair of spectacles, showing the attached saddle. Fig. 3 is a back view of the saddle detached. Fig. 4 is an edge view projected from Fig. 3; and Fig. 5 is a back view of one of a pair of said pads, illustrating a modification.

Like letters and numerals refer to like parts in all the figures.

The lenses of a pair of frameless spectacles are represented at A, their bridge at B, and their temples at C. S represents a preferred make of the improved saddle. The saddle in this form is conveniently punched in one piece from pliable metal—such as soft steel, iron, gold, silver, or any suitable metal or alloy that can be bent to the required extent by the optician's pliers and will retain its shape with a reasonable degree of permanency. It is preliminarily shaped for the market, as in Figs. 3 and 4, by means of suitable dies.

Said improved saddle is composed of a rigid or substantially rigid arch 1, concavo-convex in cross-section, as shown in Figs. 1 and 4, pliable attaching fingers or clips 2, integral with the edges of said arch and preferably located at its ends, a pair of side pads 3, preferably spoon-shaped, with convex surfaces $a$ toward the face and concave backs $b$ turned outward, and sinuous pliable connections 4, substantially square in cross-section, so as to be twisted or bent in any direction, the latter serving to connect the arch and side pads and being preferably and conveniently integral with the ends of the arch and with the inner ends of said pads.

The concave top of the arch 1 is fitted to the spectacles-bridge, as in Figs. 1 and 2, and is tightly held fast thereto by means of the fingers 2, which embrace the bridge when clenched, as in Fig. 2, and hold the saddle securely in place.

In fitting the spectacles it is then only necessary to adjust the pads 3 by manipulating the pliable connections 4, and when the pads are once located they are retained in position by the rigidity of the metal, which is sufficient for this purpose, and more particularly in said preferred form of the saddle by the rigid or substantially rigid arch 1, which prevents any displacement of the pads relative to each other in case the attaching device should become loosened and coöperates with the latter to insure the retention of the pads in correct position. A pair of like side pads 3, attached in like manner by pliable bridge-embracing fingers 2 and adjustable by means of like pliable connections 4, may be disconnected from each other except by the spectacles-bridge, each pad with its attaching device constituting a distinct part, as illustrated by Fig. 5. In this case the pliable fingers 2 and the pliable connection 4, belonging to each pad, are integral with a short concavo-convex abutment c, similar to one end of the arch 1, and the fingers 2 are preferably duplicated, as shown at 2 2, Fig. 5.

The arch 1 and the side pads 3, either or both, may be padded with cork or the like, as shown, for example, in my drawings forming part of United States Patent No. 572,307, dated December 1, 1896. The improved saddle as a whole or its metallic portions may be formed of wire, if preferred, and other like modifications will suggest themselves to those skilled in the art.

In my specification forming part of Patent No. 329,474, dated November 3, 1885, I describe and claim an attachable nose-piece for spectacles constructed of pliable metal of saddle shape and concavo-convex in cross-section and with attaching fingers or clips integral with its upturned edges, the same being adjusted bodily upon the bridge in front of the plane of the lenses or behind such plane or in line with the lenses to insure a proper relation of the lenses to the eyes of the wearer. My present device is adjusted instead as to its pads 3 only, and as to these by bending its sinuous pliable connections 4, which, together with said pads, have no counterparts in said previously-patented device, and I adapt the arch 1 to be tightly fitted to and fastened in position once for all upon the spectacles-bridge when the saddle is attached by the optician.

Having thus described said improvement, I claim as my invention and desire to patent under this specification—

1. An attachable saddle for spectacles comprising a concavo-convex arch fitted at top to the spectacles-bridge, pliable attaching fingers integral with the upturned edges of said arch, a pair of pads to rest upon the face at the sides of the nose, and pliable sinuous connections between the arch and said pads.

2. A saddle for spectacles comprising an arch attachable to the spectacles-bridge, a pair of forwardly-projecting pads arranged to rest upon the face at the sides of the nose, and pliable connections between said arch and said pads.

3. The combination with a spectacles-bridge of a pair of pads to rest upon the face at the sides of the nose, pliable attaching devices embracing the bridge, and sinuous pliable connections between said pads and attaching devices, substantially as hereinbefore specified.

EMIL B. MEYROWITZ.

Witnesses:
O. W. MEYROWITZ,
J. J. SCHUCK.